No. 626,523. Patented June 6, 1899.
R. BODMER & J. SCHWARZENBACH.
APPARATUS FOR SEPARATING LIQUIDS FROM FIBROUS MATERIALS.
(Application filed Oct. 20, 1898.)
(No Model.)

Witnesses:—
Jas. A. Richmond.
G. W. Hill

Inventors:—
Rudolf Bodmer and
Johannes Schwarzenbach
by G. Dittmar
Attorney.

THE NORRIS PETERS CO., PHOTO-LITHO., WASHINGTON, D. C.

UNITED STATES PATENT OFFICE.

RUDOLF BODMER AND JOHANNES SCHWARZENBACH, OF ZURICH, SWITZERLAND.

APPARATUS FOR SEPARATING LIQUIDS FROM FIBROUS MATERIALS.

SPECIFICATION forming part of Letters Patent No. 626,523, dated June 6, 1899.

Application filed October 20, 1898. Serial No. 694,134. (No model.)

*To all whom it may concern:*

Be it known that we, RUDOLF BODMER and JOHANNES SCHWARZENBACH, citizens of the Republic of Switzerland, and residents of Zurich, Switzerland, have invented certain new and useful Improvements in Apparatus for the Separation of Liquids from Fibrous Materials; and we do hereby declare the following to be a full, clear, and exact description of the invention, such as will enable others skilled in the art to which it appertains to make and use the same.

The present invention relates to devices for extracting dyes and such substances from fibrous material; and it consists in certain apparatus for separating and discharging the liquids from the vessel employed in the treatment of the fibrous material and to perform such functions without the application of centrifugal force. The resulting advantage consists of a considerable saving in labor and material, because a large quantity of material may be treated with a proportionately small quantity of liquid and the latter after use may be removed by pressure.

The improved apparatus is illustrated in the accompanying drawings, wherein—

Figure 1:
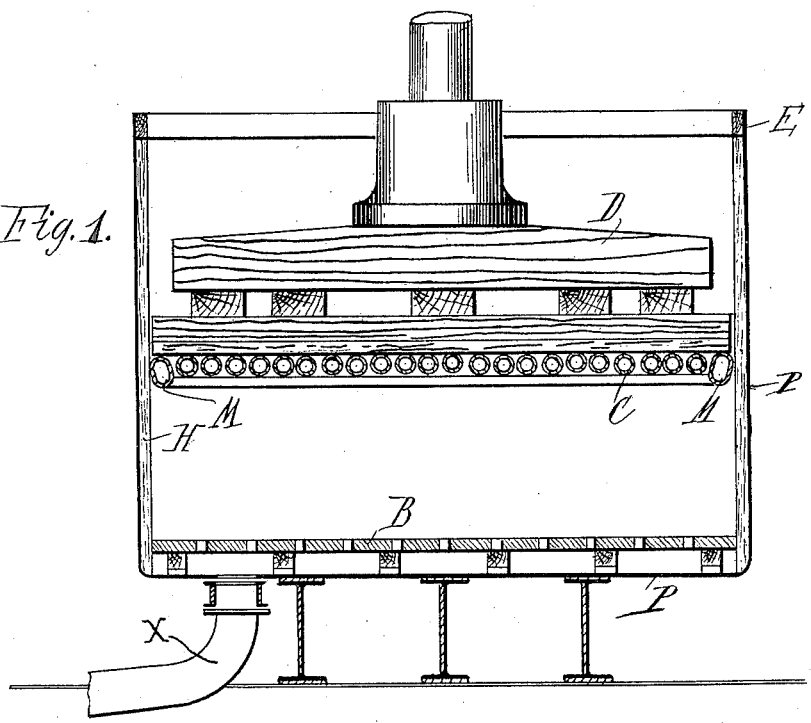
Figure 2:
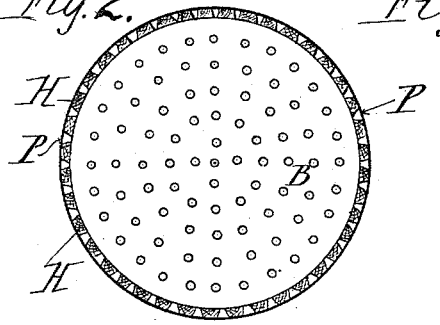
Figure 3:
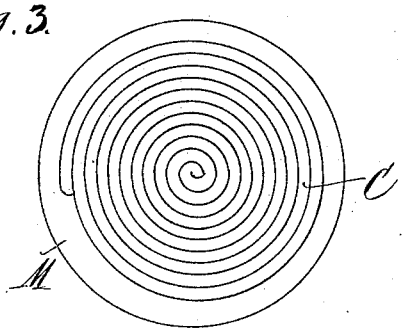

Figure 1 is a longitudinal section; Fig. 2, a transverse section, and Fig. 3 a view of the compression-spiral.

The vessel P carries interiorly the perforated plate B, which is placed flat on the bottom. To the side walls and vertically to the bottom are fastened at slight distances from each other the strips H, reaching from bottom to top of the vessel. These strips are pressed by the perforated plate against the walls of the vessel. At the top the strips are securely connected to each other—for instance, by the horizontal frame E, which is made to conform to the shape of the vessel.

In operation the vessel is filled to about three-fourths of its depth with the fibrous material to be treated. The water or other liquid to be used may be supplied either under pressure through the pipe $x$ through the bottom of the vessel or made to flow in from the top in any suitable way. By frequently changing the entrance of the liquid from the top to the bottom of the vessel a uniform saturation of the fibrous material is assured. The liquid is then shut off and the cover D replaced. This cover is provided on the lower side with an elastic cushion, the thickness of which increases from the center toward the periphery. This construction purports to exert the same pressure at the periphery as at the center, resulting in an even pressure throughout, and also to overcome any unevenness in the layer of the material. In the apparatus here illustrated this elastic cushion consists of the air-tight hose-spiral C and the endless compression-hose M, the latter being of a considerably larger diameter than the spirals. The spiral, as well as the outer ring or compression-hose, contains only the ordinary atmospheric pressure. As soon as a powerful exterior pressure is brought to bear upon the cover, the liquid will escape through the bottom and through the apertures between the strips. Under no circumstance can it flow over the cover, for the conic construction of the strips, Fig. 2, is such that the narrow side is placed toward the inside walls and the broader side toward the material. This arrangement thus provides a small opening for the escape of the liquid into a large space for drawing off. As soon as the liquid enters this space between the strips it flows off freely toward the bottom, being no longer under pressure, and as the space for flowing off is connected with the chamber beneath the perforated plate the upward flow of the liquid is thus prevented. The endless hose M should not be pressed in the space between the strips, as in this case it would soon become damaged. This hose serves, first, as a means for holding the spiral C together, and, secondly, to exert a pressure as far as possible uniformly over the entire surface under the cover, which would be impossible with the spiral alone on account of the fittings at the end. According to the pressure on the cover the material will be as dry in from fifteen to thirty minutes as with a centrifugal machine.

By applying the system of strips alone no distribution of pressure takes place, and the layer of material, according to the manner in which it has been placed in the vessel, may become uneven in the same degree—higher or lower in some places. The high places will then receive more pressure and the low places less pressure. To overcome this unevenness, a strong pressure would become necessary, resulting in damage to apparatus and material. This would also cause a strong friction against the strips at the frame for the cover, which is then to be placed very carefully in position. As in this case the cover would not be provided with the elastic cushion, the cover may assume a slanting position through the unevenness of the material and probably force some of the upper layers of the materials between cover and strips, and thus tear the material. On the other hand, a much stronger pressure is necessary when the elastic cushion alone is provided, since in the absence of the strips the lateral flowing off of the liquid cannot take place, and it can only escape through the material downwardly by way of the perforated plate. In this case the outer compression-hose would have to be made very strong to resist the additional pressure. In this instance, also, there is a liability of the apparatus being damaged.

It is therefore evident that only by applying both of the above-described novel features can the results be had of a uniform quick pressure and a drying of the material with the least abrasion to the apparatus.

Having thus described our invention, we claim—

An apparatus for separating and removing liquids from fibrous materials, consisting of a suitable container carrying a plurality of strips with spaces formed intermediate the same for the passage of a liquid, a suitable cover with means for pressing the same upon the fibrous material and a cushion carried on the under side of said cover, composed of a hose-spiral and a larger hose surrounding the same whereby the pressure is uniformly distributed, substantially as described.

In witness whereof we have hereunto set our hands in presence of two witnesses.

RUDOLF BODMER.
JOHANNES SCHWARZENBACH.

Witnesses:
HENRY SCHNABEL,
G. PFISTER BILLETER.